(12) United States Patent
Weber

(10) Patent No.: US 11,660,729 B2
(45) Date of Patent: May 30, 2023

(54) CLAMPING DEVICE WITH PLANAR CONTACT

(71) Applicant: Klingelnberg AG, Zürich (CH)

(72) Inventor: Jürgen Weber, Hückeswagen (DE)

(73) Assignee: KLINGELNBERG AG, Zürich (CH)

( * ) Notice: Subject to any disclaimer, the term of this patent is extended or adjusted under 35 U.S.C. 154(b) by 382 days.

(21) Appl. No.: 16/837,134

(22) Filed: Apr. 1, 2020

(65) Prior Publication Data
US 2020/0316755 A1 Oct. 8, 2020

(30) Foreign Application Priority Data

Apr. 4, 2019 (DE) .......................... 102019108817.8

(51) Int. Cl.
| | | |
|---|---|---|
| B25B 5/00 | (2006.01) | |
| B25B 5/14 | (2006.01) | |
| B23F 23/12 | (2006.01) | |
| B23B 31/20 | (2006.01) | |

(52) U.S. Cl.
CPC ............ B25B 5/14 (2013.01); B23B 31/2073 (2021.01); B23F 23/12 (2013.01)

(58) Field of Classification Search
CPC ........... B25B 5/00; B25B 5/107; B25B 11/00; B25B 11/02; B23Q 3/00; B23Q 3/06; B23Q 3/067
See application file for complete search history.

(56) References Cited

U.S. PATENT DOCUMENTS

| | | | |
|---|---|---|---|
| 2,535,199 A | 12/1950 | Day | |
| 3,083,976 A * | 4/1963 | Stark | ...................... B23B 31/207 |
| | | | 279/139 |
| 7,284,938 B1 | 10/2007 | Miyazawa | |
| 7,648,132 B2 * | 1/2010 | Hediger | ............. B23Q 11/0032 |
| | | | 279/133 |

(Continued)

FOREIGN PATENT DOCUMENTS

| | | |
|---|---|---|
| DE | 202009007821 U1 | 10/2009 |
| DE | 102015113099 A1 | 2/2017 |

OTHER PUBLICATIONS

Search Report for Application No. DE 10 2019 108 817.8, dated Nov. 26, 2019, 6 pages.

(Continued)

*Primary Examiner* — Lee D Wilson
(74) *Attorney, Agent, or Firm* — McCarter & English, LLP

(57) ABSTRACT

Clamping device having a receiving opening which is arranged concentrically to a workpiece spindle axis, wherein the clamping device is designed for clamping a gear workpiece comprising a head region and a shaft,
 the clamping device comprises an annular planar contact surface, which
  is arranged concentrically to the workpiece spindle axis,
  is located in a workpiece-side end region of the clamping device, and
  which extends essentially perpendicular to the workpiece spindle axis,
 wherein at least one circumferential groove is provided in the workpiece-side end region, which groove extends from an outer surface of the clamping device radially in the direction of the workpiece spindle axis and which (Continued)

provides the clamping device with elasticity in the region of the planar contact surface.

12 Claims, 5 Drawing Sheets

(56) References Cited

U.S. PATENT DOCUMENTS

| 8,585,027 | B2* | 11/2013 | Kawakami | B23Q 1/009 |
| | | | | 269/25 |
| 8,708,622 | B2* | 4/2014 | Weber | B23F 23/00 |
| | | | | 409/141 |
| 10,710,171 | B1* | 7/2020 | Chen | B23Q 3/12 |
| 2009/0155010 | A1 | 6/2009 | Cook | |
| 2020/0316755 | A1* | 10/2020 | Weber | B23F 23/06 |

OTHER PUBLICATIONS

Search Report for Application No. EP 20167875.2, dated Sep. 10, 2020, 11 pages.

\* cited by examiner

CLAMPING DEVICE WITH PLANAR CONTACT

CROSS-REFERENCE TO RELATED APPLICATIONS

This application claims priority under 35 U.S.C. §§ 119(a)-(d) to German patent application no. DE 10 2019 108 817.8 filed Apr. 4, 2019, which is hereby expressly incorporated by reference as part of the present disclosure.

FIELD OF THE INVENTION

The present disclosure relates to clamping devices for gear workpieces, e.g., for use in gear cutting machines for machining gears.

BACKGROUND

During the machining of gears, waviness can occur on the surfaces of the tooth flanks, the roughness of which is typically in the μm range. The effort required to machine wavy tooth flanks is often relatively high.

Avoiding such waviness is the subject matter of the German utility model DE202009007821U1. This utility model is specifically concerned with an approach that makes it possible to dampen vibrations that can occur on a gear workpiece clamped in a processing machine. According to the description of this utility model, the vibrations result from the dynamic interaction of the gear cutting tool with the gear workpiece clamped in a clamping device. A flat, ring-shaped vibration damping element is used on the clamping device to dampen the vibrations that occur.

Despite this measure which was mentioned by way of example and was designed to reduce waviness, there are still bevel gears whose tooth flanks continue to show waviness, especially when machining the tooth flanks of bevel gear workpieces.

SUMMARY

Therefore, an object of the present disclosure is offering a solution which allows to prevent or reduce the above-discussed waviness of the tooth flanks during the machining of gears with gear cutting tools, such as during the machining of bevel gears.

According to the embodiments of the invention, this object is achieved by a clamping device with a receiving opening, which is arranged concentrically to a workpiece spindle axis, wherein
  the clamping device is designed for clamping a gear workpiece comprising a conical head portion with teeth and a shaft or shank,
  the clamping device comprises an annular bearing surface,
    which is arranged concentrically to the workpiece spindle axis,
    which is located in a workpiece-side end region of the clamping device, and
    which extends essentially perpendicular to the workpiece spindle axis.
The clamping device of at least some embodiments is characterized in that in the end region on the workpiece side at least one circumferential groove is provided as a recess, which extends from an outer surface of the clamping device radially in the direction of the workpiece spindle axis and/or which extends from an inner surface of the clamping device radially outwards in relation to the workpiece spindle axis.

Numerous investigations of the machining steps and the surface condition of the flanks of gear workpieces were performed.

The inventor determined that the waviness occurs mainly during the dry machining of gear workpieces. Further investigations have then confirmed that there is a direct correlation between the large heat input that occurs during dry machining and the occurrence of waviness.

One reason for this was that the gear workpiece seemed to be released minimally from the clamping. In order to counteract this, an attempt was made to re-clamp the gear workpiece in the clamping device during gear machining. However, this approach did not lead to a significant improvement.

Further investigations then showed that the waviness mentioned above is caused by the fact that the gear workpiece is subjected to torsional vibrations during machining. These torsional vibrations are apparent in the transition area between the head region and the shaft/shank of the gear workpiece.

It was deduced that these torsional vibrations occur above all when the gear workpiece heats up considerably due to machining. If the gear workpiece is clamped with its shaft or shank in a clamping device, the shaft or shank can only expand in the axial direction. Expansion in the axial direction causes a small (in the range of a few microns) axial displacement of the head region of the gear workpiece. As a result, the planar contact, which previously existed between an axial contact shoulder of the head region and a contact surface of the clamping device, is reduced and the head region can be excited to torsional vibrations by the gear tool.

These torsional vibrations cause very small displacements between the gear cutting tool and the gear workpiece, which in turn can lead to the formation of the waviness mentioned above.

In at least one embodiment, it prevents or strongly dampens these vibration states in the head region of the gear workpiece by attaching an elastic planar contact.

The invention can be applied, for example, to clamping devices comprising a main body with a receiving opening for receiving the shaft or shank of a gear workpiece. With such embodiments, the circumferential groove can be provided in the workpiece-side area of the main body.

The invention can also be applied, as another example, to clamping devices comprising a nose piece (also called a centering bushing) with a central receiving opening. With such embodiments, the circumferential groove can be provided in the workpiece-side area of the nose piece. In at least some embodiments, such clamping devices also comprise, in addition to the nose piece, a main body with a central receiving opening for accommodating a gear workpiece. In this case, the nose piece sits between the main body and the gear work piece.

In certain embodiments, a conical outer surface can be present in a workpiece-side end region of the main body or the nose piece, wherein the circumferential groove starting from this surface extends radially as an external recess in the direction of the workpiece spindle axis.

In addition or alternatively, an inner surface can be present in an end region of the main body or the nose piece on the workpiece side, wherein the circumferential groove starting from this inner surface extends radially outwards in relation to the workpiece spindle axis as an internal recess.

In certain embodiments, there is a material region in the area of the face contact (i.e. in the area of a stop plane) that does not deform, to provide a defined installation dimension or clamping dimension. This non-deformable material region may serve quasi as an exactly defined stop for the heel of the gear workpiece when pushing the shaft/shank of the gear workpiece into the receiving opening. The heel is therefore also referred to as the axial system heel on the gear workpiece.

At least some embodiments include a planar contact check, which serves to check the planar contact of the gear workpiece against the clamping device during machining.

Further advantageous embodiments can be found in the further description herein.

BRIEF DESCRIPTION OF THE DRAWINGS

Other advantages and features will become apparent from the following detailed description, which are understood not to be limiting, will be described in greater detail hereafter with reference to the drawings.

DETAILED DESCRIPTION

In connection with the present description, terms are used which are also used in relevant publications and patents. It should be noted, however, that the use of these terms is merely intended to facilitate understanding. The inventive idea and the scope of protection of the claims should not be restricted in interpretation by the specific choice of terms. The invention can easily be transferred to other conceptual systems and/or fields. In other areas of expertise the terms are to be applied analogously.

Figure 1:
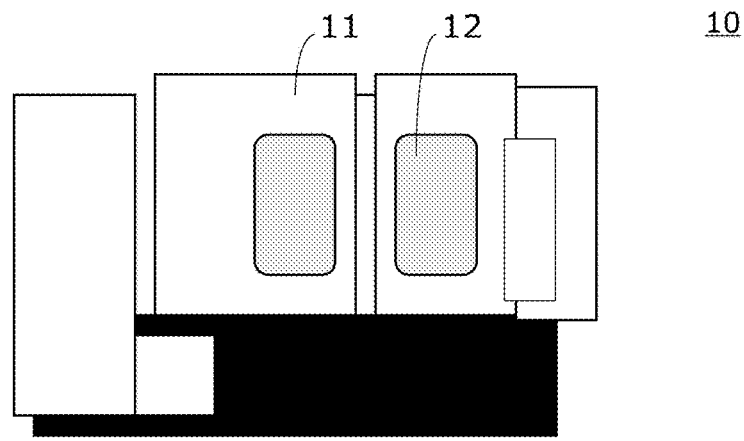
FIG. 1 schematically shows a front view of a gear cutting machine in which the clamping device according to at least some embodiments can be used.

FIG. 1 shows a schematic view of a (gear) machine 10. Machine 10 is a gear cutting machine designed for machining the gear teeth of gear workpieces. The machining area in which gear workpieces are machined can be located behind an enclosure 11 with a viewing window 12.

The gear machine 10 is specially designed for machining the tooth flanks of gear workpieces 1 with a gear cutting tool and has a clamping device 20 for clamping a gear workpiece 1 to be machined. An exemplary clamping device 20 is shown in FIG. 2A in perspective form, wherein only the essential elements are marked with reference signs.

Figure 2A:
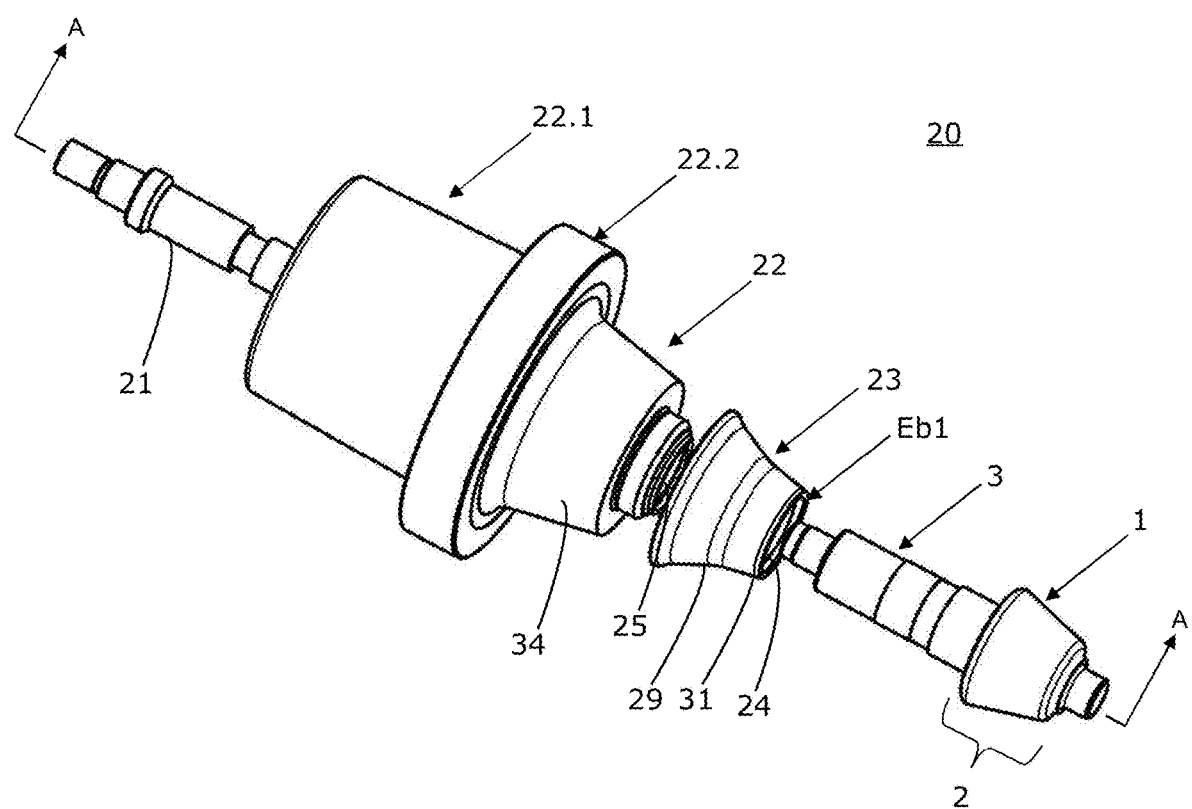
FIG. 2A shows a perspective exploded view of a clamping device for clamping a gear workpiece in the form of a bevel gear pinion with shaft.

As shown in the exploded view in FIG. 2A, a gear workpiece 1 can include a conical head region 2 and a shaft or shank 3. Head region 2 contains the tooth flanks (not shown) which are to be machined, or in head region 2 the tooth flanks are machined from the material of gear workpiece 1.

The clamping device 20 comprises here a clamping device main body 22 and a nose piece 23 in order to be able to clamp the gear workpiece 1 (here a bevel gear pinion with pinion shaft 3). The ring-shaped nose piece 23 is connected to the main body 22 and the pinion shaft 3 is pushed into the central bore 24 of the nose piece 23 and the central bore 25 of the main body 22. Then the pinion shaft is clamped there. The nosepiece 23 serves on the one hand as a centering bushing and on the other hand as an adapter. By selecting the appropriate nose piece 23, the shape and/or size can be adjusted.

The clamping device 20 can, for example, be inserted with an external cone 22.1 into a conical receiving opening of the workpiece spindle (not shown) of the machine 10 and fastened there with screws. The corresponding screw holes can be provided e.g. on the circumferential flange 22.2 of the main body 22.

Figure 2B:
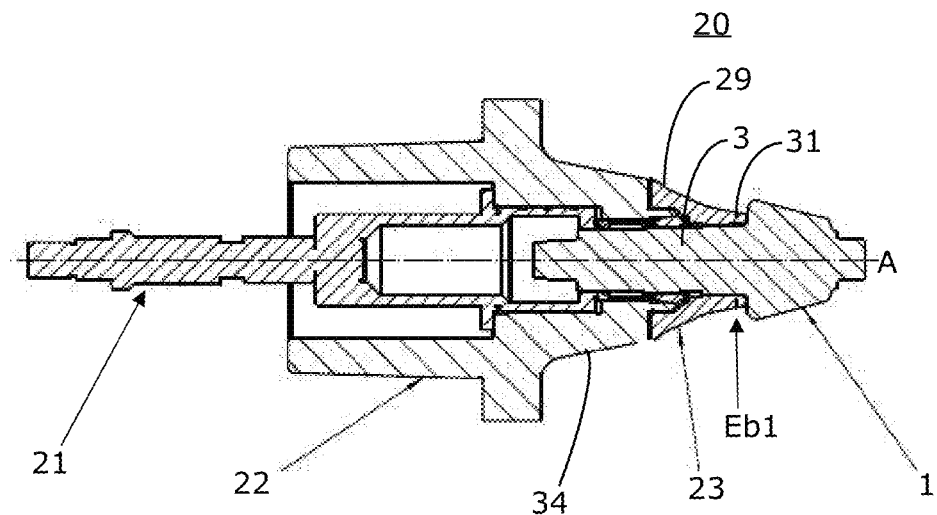
FIG. 2B shows a sectional view of the clamping device of FIG. 2A along section A-A, which is along the spindle axis.

The spindle axis of the workpiece spindle bears the reference sign A in FIG. 2B. Since all essential elements in the mounted/clamped state are coaxial to this spindle axis A, reference is always made to this axis A in the following. A so-called tool-side area is also mentioned. The tool-side area is the area of the clamping device 20 which is close to or directly on the gear workpiece 1.

Figure 2C:
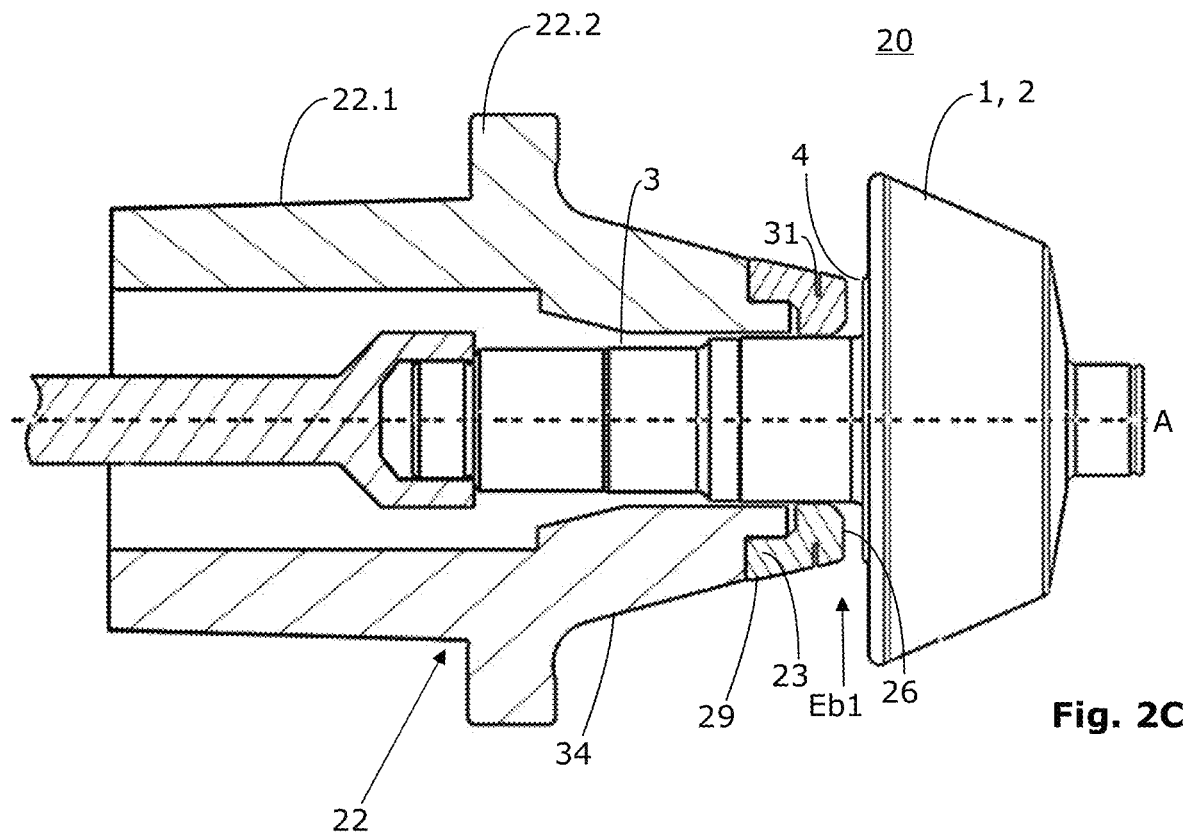
FIG. 2C schematically shows a partial sectional view of a another clamping device shown in section along the spindle axis.

The nosepiece 23 has an annular connecting flange 26 with a planar annular surface (called axial flange surface, annular bearing surface or planar contact surface), as shown in the highly schematic diagram in FIG. 2C. An air gap is shown in FIG. 2C between the nose piece 23 and the heel 4 of the gear work piece 1 to show the connecting flange 26. In the clamped state, an area of the heel 4 and this planar contact surface 26 lie flat on top of each other.

At the nose piece 23, the annular planar contact surface 26 is resiliently designed, as further described below with respect to the embodiment shown in FIGS. 3A to 3D.

As described above, the shaft 3 is pushed into the central bore 24 of the ring-shaped nose piece 23 and the central bore 25 of the main body 22. In this process, a large tensile force P1 (cf. FIG. 3A) is applied parallel to the workpiece spindle axis A in order to pull the gear workpiece 1 together with shaft 3 into the clamping device 20 and hold it there. The heel 4 (cf. FIG. 3A) of the gear workpiece 1 is pulled against the annular planar contact surface 26 (cf. FIG. 3B). The flat contact of the two surfaces is called planar contact.

In order to avoid torsional vibrations which can occur when the gear workpiece 1 heats up and expands axially, a part of the annular planar contact surface 26 is resilient.

In the embodiment example of FIGS. 3A to 3D, a circumferential groove 31 is provided for this purpose in the area of the planar contact surface 26. For example, this groove 31 can be arranged/designed so that it extends radially from an outer cylindrical or conical surface 29 in the direction of the central workpiece spindle axis A. Such an external circumferential groove 31 is also referred to herein an external recess.

The provision of such a circumferential groove 31 defines a resilient restoring force. In order to address the given circumstances (e.g., the forces occurring and the expected thermal expansion), the restoring force can be set relatively precisely by positioning and/or dimensioning the circumferential groove 31, as will be understood by those of ordinary skill in the art.

For example, a finite element method can be used to calculate the restoring force.

The geometrical design (e.g. groove depth, groove shape, groove position) and the material properties (modulus of elasticity of the nose piece 23) have an influence on the spring properties of this part. In the embodiment shown, the radial depth Tr and also the axial distance Aa to the planar contact surface 26 can be predetermined in order to define the resilient restoring force. Furthermore, the clear (open) width of the groove 31 (measured in axial direction) can also have an influence on the "movability/deformability" of the overhanging material region 30 of the nose piece 23. The larger the clear width of the groove 31, the more room for movement or space for deformation this material region 30 has, whereas with a small clear width the groove 31 can close relatively quickly when axially directed forces occur. After closing the groove 31, the elastic effect is virtually eliminated.

The tensile force P1, which is applied parallel to the workpiece spindle axis A, may be transmitted to the shaft 3 of the gear workpiece 1 by means of a concentrically arranged collet chuck 32, or a number of clamps or arms, for example. For this purpose, these elements surround or enclose a section of shaft 3.

In the embodiment shown in FIGS. 3A to 3D, a concentrically arranged collet chuck 32 is used, which encloses a workpiece-side area of the shaft. This collet chuck 32 has a conical annularly circumferential surface in its area B (cf. FIG. 3A) facing away from the gear workpiece 1. In addition, the collet chuck 32 is slotted in the axial direction so that it can be pressed against the shaft 3.

Figure 3A:
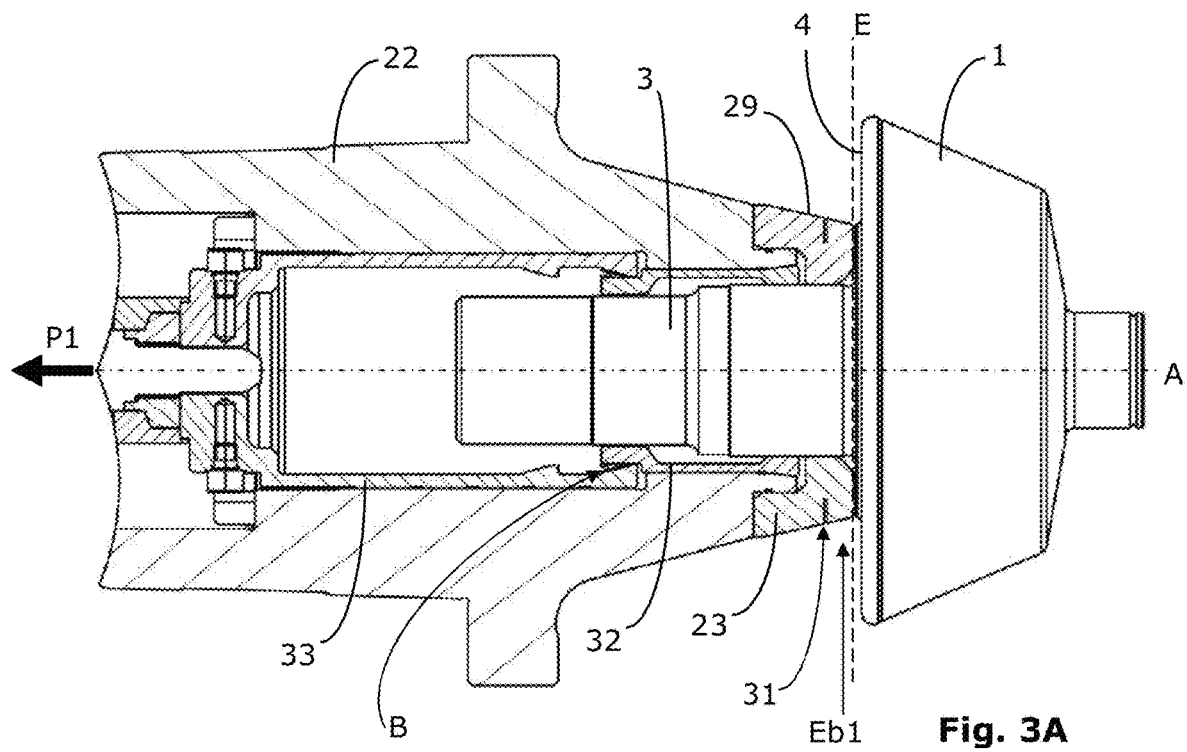
FIG. 3A shows a partial sectional view of a further clamping device for clamping a gear workpiece in the form of a bevel gear pinion with a shaft, shown in section along the spindle axis.
Figure 3B:
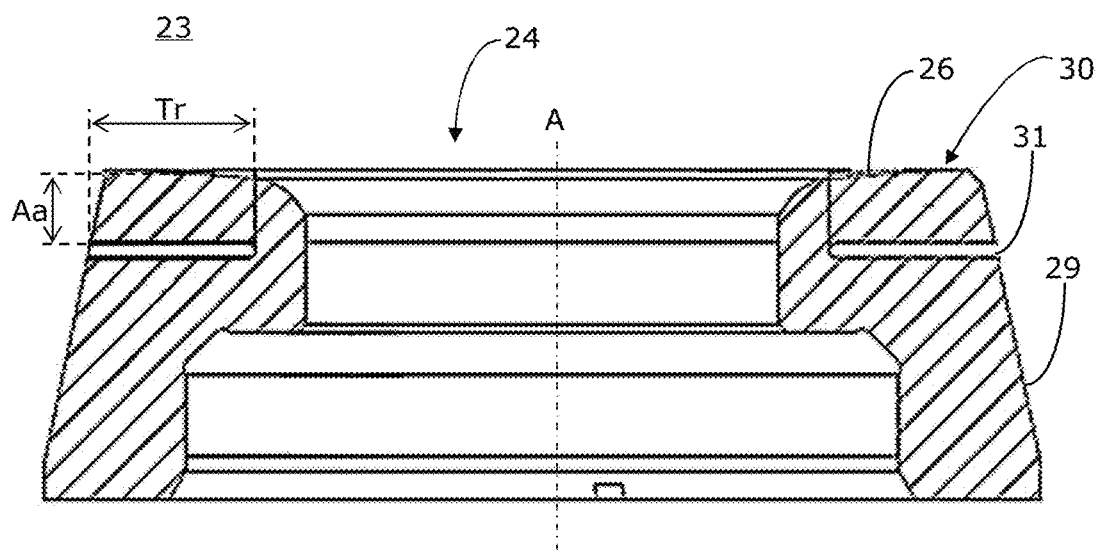
FIG. 3B shows an enlarged sectional view of a nose piece of the clamping device of FIG. 3A, showing a non-clamped condition.

FIGS. 3A-3D show details of a double collet chuck. In area B the collet chuck 32 is enclosed by a collet insert 33. This collet insert 33 has a ring-shaped, conical inner surface in area B. If now, as indicated in FIG. 3A by the arrow P1 pointing to the left, a tensile force is exerted on the collet insert 33, the conical inner surface of the collet insert 33 shifts relative to the conical outer surface of the collet chuck 32 and the collet chuck 32 is pressed firmly against the shaft 3 with an inwardly pointing wall. In area B, a force presses substantially radially on shaft 3. Since this is a double collet chuck, collet chuck 32 also presses radially on shaft 3 in area C (see FIG. 3D). At the same time as these radially directed forces occur, a tensile force is applied in the axial direction. This tensile force pulls the gear workpiece 1 against the annular planar contact surface 26 of the nose piece 23 and into the clamping device 20.

Instead of a double collet chuck, a single collet chuck can be used.

Figure 3C:
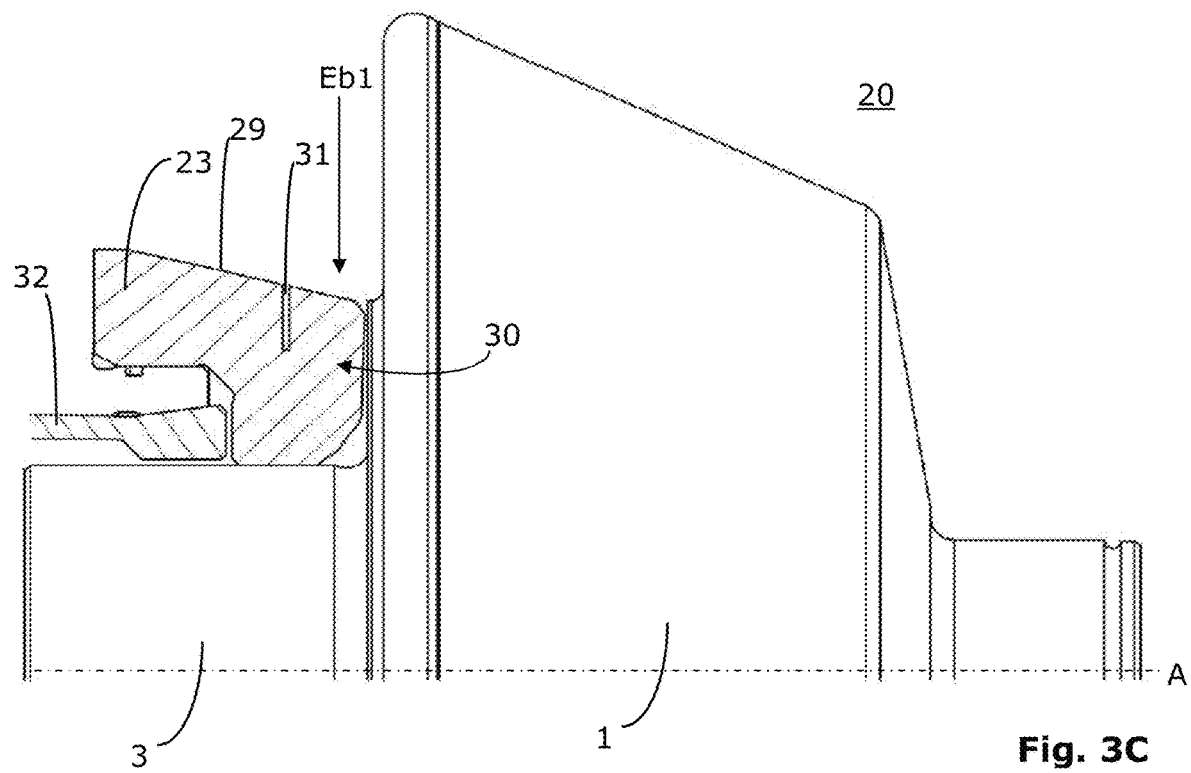
FIG. 3C shows an enlarged portion of the clamping device of FIG. 3A, showing a condition with a non-clamped gear workpiece.
Figure 3D:
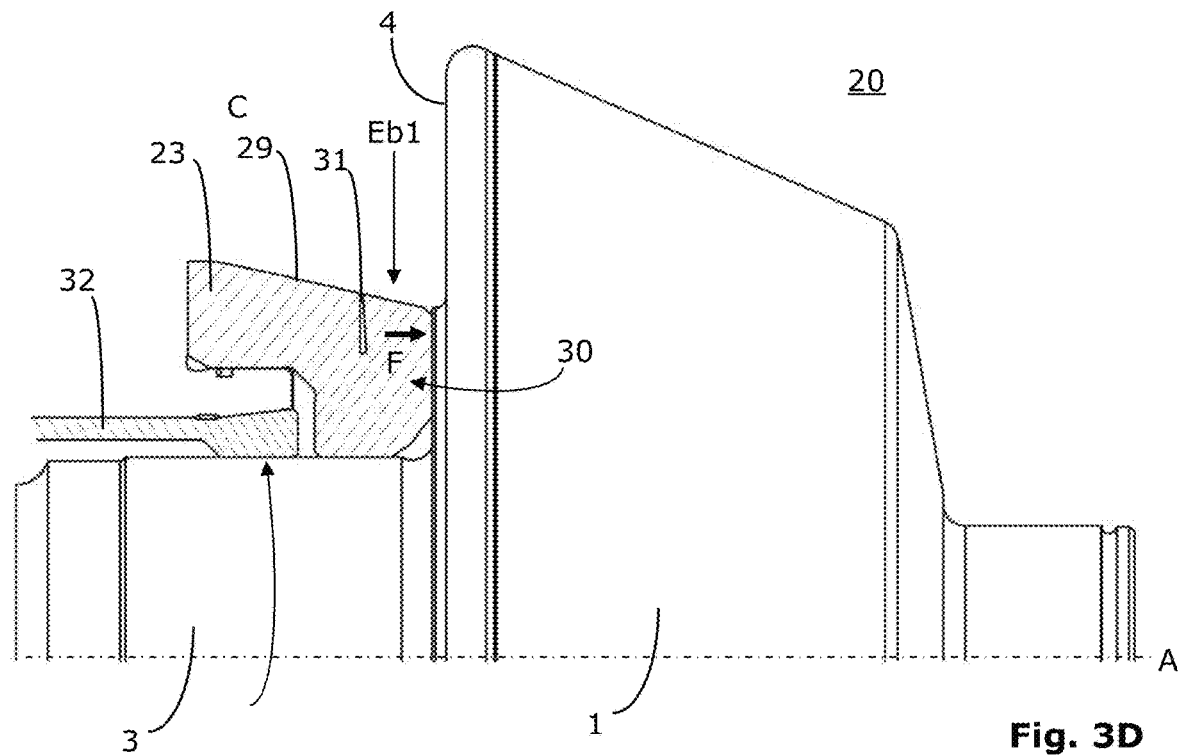
FIG. 3D shows an enlarged portion of the clamping device of FIG. 3A, wherein a condition with clamped gear workpiece is shown.

FIG. 3C shows the situation with non-clamped gear workpiece 1. The circumferential groove 31 has its original clear width (measured in axial direction). FIG. 3D shows the situation with clamped gear workpiece 1. It can be seen from FIG. 3D that the material region 30 is slightly deformed. Due to the "movability/deformability" of the material region 30 of the nose piece 23, a restoring force F (cf. FIG. 3D) results, which presses essentially in an axial direction against the heel 4 of the gear workpiece 1.

The gear workpiece 1 is clamped due to the force acting radially on the shaft 3 in area C and due to the positive connection acting between heel 4 and the annular planar contact surface 26 in the axial direction. In area C, frictional forces are mainly acting. Also in the area between the ring-shaped supporting surface 26 and the heel 4, frictional forces act in a tangential direction (on a circle in plane E).

If now, due to increased temperatures, the head region 2 in FIG. 3D should shift to the right, the material region 30 will follow this movement due to the restorative force therein, and a planar contact will also continue to be maintained. Because the planar contact is maintained, the frictional forces acting in the tangential direction are also retained. This prevents or effectively reduces torsional vibrations.

If the shaft 3 expands in the axial direction during the machining of the gear workpiece 1, the "movability/deformability" of the material region 30 of the nose piece 23 means that a planar contact between the heel 4 and the annular planar contact surface 26 is still maintained, which avoids or significantly reduces the aforementioned torsional vibrations.

So far, embodiments of the clamping device 20 have been described which have a separate nose piece 23. Such a nose piece 23 can be used, for example, to adapt a universal clamping device 20 to the geometry and dimension of the gear workpiece 1.

Instead of using a nose piece 23, the clamping device 20 as such can have the described "movability/deformability" of a material region 30. In this case, the functionality is the same. In an embodiment with nose piece 23, as shown in FIG. 2C, the circumferential groove 31 on the nose piece 23 is located in area Eb1 of the nose piece 23.

If the nose piece 23 is omitted, then the circumferential groove 31 on the main body 22 can be located in the area close to the workpiece.

An embodiment with groove 31 on the main body 22 is not shown in the figures, but can be derived from the figures and the description.

In those embodiments that have a circumferential groove 31 in the area close to the workpiece on the main body 22, the collet chuck 32 and the collet insert 33 are designed and/or arranged differently, as one of ordinary skill would understand. However, the functionality of these elements may be the same.

Figures 4A, 4B, 4C, 4D:
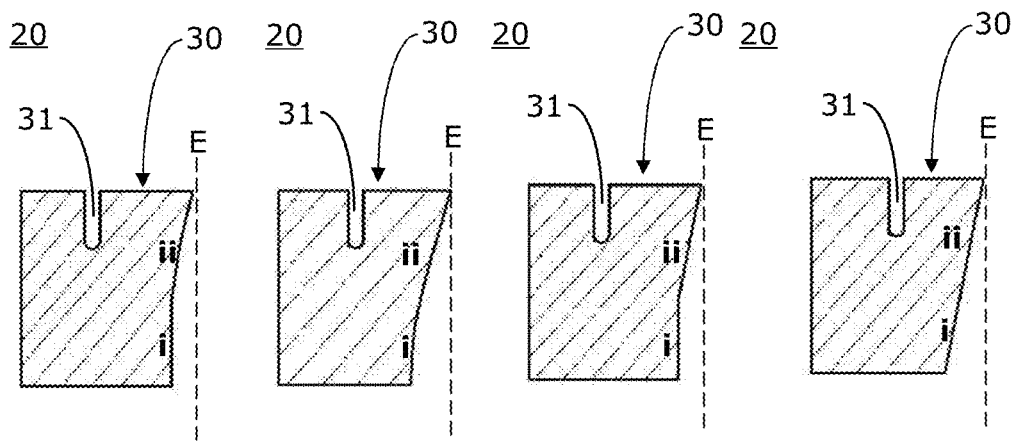
FIG. 4A shows an enlarged section of an area of another clamping device.
FIG. 4B shows an enlarged section of an area of another clamping device.
FIG. 4C shows an enlarged section of an area of another clamping device.
FIG. 4D shows an enlarged section of an area of another clamping device.

For at least some of the embodiments, the planar contact surface 26 can be machined by turning so that it has an inner annular area i which extends in a flat and perpendicular manner to the workpiece spindle axis A. This inner annular area i may be surrounded by an outer annular area ii which rises slightly conically outwards. An example is shown in FIG. 4C as a section of the clamping device 20. In order to show the position of the surface, which is stretched from heel 4, the plane E is drawn as a dashed line here. Plane E indicates the stop plane of the gear workpiece 1. FIG. 4C shows the non-clamped condition.

If the gear workpiece 1 is now tightened with force P1, the outer annular area ii is deformed while the clear width of the groove 31 is reduced. This results in a complete planar contact at the inner and outer ring-shaped areas i and ii, as can be seen in FIG. 3D.

FIGS. 4A, 4B and 4D show three further embodiments.

FIG. 4A shows the non-clamped state of an embodiment in which the inner annular area i extends in an at least flat and perpendicular manner to the workpiece spindle axis A. The outer annular area ii, on the other hand, has a concave extension.

FIG. 4B shows the non-clamped state of an embodiment in which the inner annular area i merges into the outer annular area ii. Both areas i and ii have a concave extension.

FIG. 4D shows the non-clamped state of an embodiment in which the inner annular area i merges into the outer annular area ii. Both areas i and ii have an at least substantially straight extension with a constant gradient.

The embodiments of FIGS. 4A-4D and 5A-5C are only to be understood as examples. The radial depth Tr and the axial distance Aa (see FIG. 3B) are also to be understood as examples.

Figures 5A, 5B, 5C:
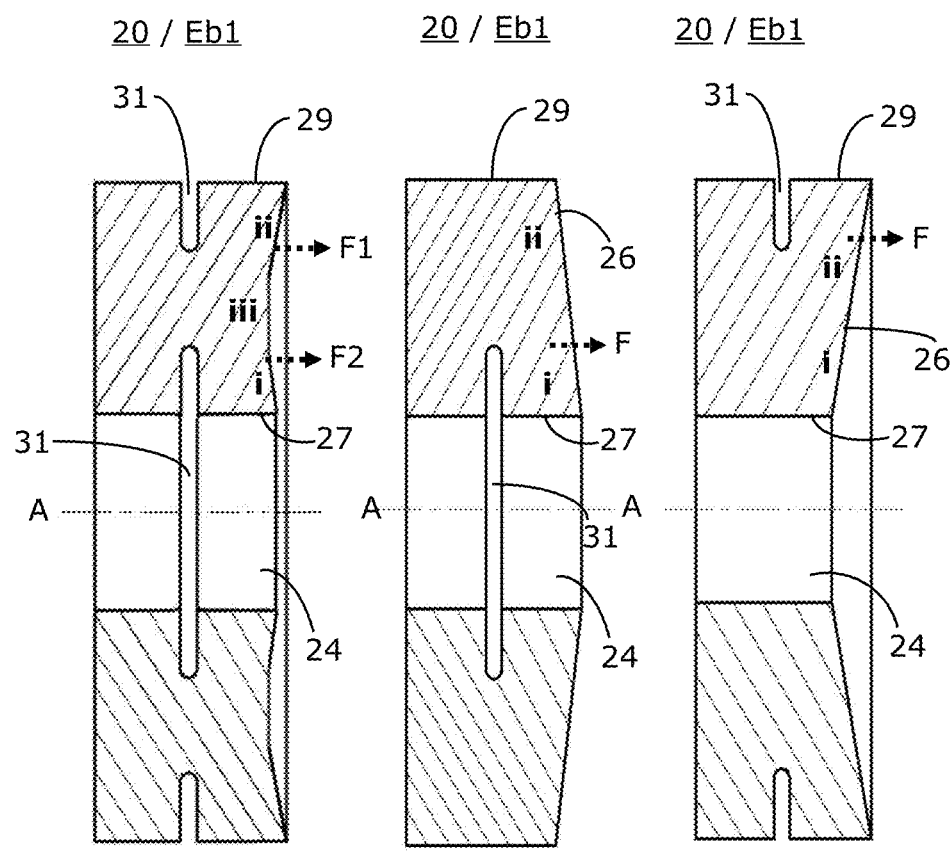
FIG. 5A schematically shows a sectional view of the area close to the workpiece of another clamping device, wherein a non-clamped condition is shown.
FIG. 5B schematically shows a sectional view of the area close to the workpiece of another clamping device, wherein a non-clamped condition is shown.
FIG. 5C schematically shows a sectional view of the area close to the workpiece of another clamping device, wherein a non-clamped condition is shown.

FIGS. 5A, 5B and 5C each show a schematic sectional view of the end region Eb1 of another clamping device 20 in the non-clamped state, close to the workpiece.

In all three cases, the end region Eb1 close to the workpiece has an outer cylinder surface 29 (a conical surface 29 can also be used, the circumference of which is reduced in the direction of the gear workpiece). In the embodiment of FIG. 5A, a circumferential groove 31 (as external recess) is provided, which extends radially from the cylinder surface 29 of the clamping device 20 in the direction of the workpiece spindle axis A. In the embodiment of FIG. 5B, on the other hand, a circumferential groove 31 (as an internal recess) is provided, which extends radially outwards from an inner surface 27 of the central bore/receiving opening 24 of the clamping device 20. In the embodiment of FIG. 5C, two circumferential grooves 31 (as external and internal recess) are provided. The embodiment of FIG. 5C has a circumferential groove 31 according to FIG. 5A and a circumferential groove 31 according to FIG. 5B.

In all three cases, the circumferential groove 31 defines a plane that is at least substantially perpendicular to the workpiece spindle axis A. However, the circumferential groove 31 can also have a slightly inclined course. The circumferential groove 31 can also have a curved (e.g. arc-shaped) course, wherein the production of such a groove 31 is considerably more complex, but should be understood by those of ordinary skill in the art. With reference to the embodiment of FIG. 5C, the two circumferential grooves 31 can also be in different planes in other embodiments.

As in the embodiment of FIG. 4D, in the embodiments of FIGS. 5A and 5B the inner annular area i merges into the outer annular area ii. This means that in the non-clamped state, a flat planar contact surface 26 exists, which in this case is slightly inclined relative to the workpiece spindle axis A. Viewed from the workpiece side, the planar contact surface 26 forms a concave area in the embodiment of FIG. 5A. Viewed from the workpiece side, the planar contact surface 26 forms a convex area in the embodiment of FIG. 5B. In the embodiment of FIG. 5A, a restoring force F results in the clamped state, which is applied (against the workpiece) further outwardly in the radial direction than in the embodiment of FIG. 5B.

The embodiment of FIG. 5C is a "combination" of the embodiments of FIGS. 5A and 5B. The planar contact surface 26 is formed in the non-clamped state from three annular areas i, ii and iii. The inner annular region i extends obliquely to the workpiece spindle axis A, the central annular region iii is at least substantially perpendicular to the workpiece spindle axis A and the outer annular region ii extends obliquely to the workpiece spindle axis. With the embodiment of FIG. 5C, two restoring forces F1, F2 result in the clamped state, as shown.

Since the respective restoring force F only occurs when the device is clamped, the arrows in FIGS. 5A, 5B and 5C are dashed.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. Clamping device comprising:
   a body including a central receiving opening configured to be concentrically located with a workpiece spindle axis; and
   an annular planar contact surface, which
      is configured to be concentrically located with the workpiece spindle axis,
      is located in a workpiece-side end region of the clamping device, and
      which extends at least substantially perpendicular to the workpiece spindle axis;
   wherein said clamping device is configured to clamp a gear workpiece comprising a head region and a shaft or a shank;
   wherein the workpiece-side end region includes at least one circumferential groove therein, said at least one groove at least one of
      extends from an outer surface of the clamping device radially toward the workpiece spindle axis or
      extends radially outwardly from an inner surface of the clamping device relative to the workpiece spindle axis; and
   wherein said at least one groove provides the clamping device with elasticity in a region of the planar contact surface.

2. Clamping device according to claim 1, wherein at least one of
   the body defines the outer surface in the workpiece-side end region, or
   the body defines the inner surface in the workpiece-side end region.

3. Clamping device according to claim 2, wherein the body defines a nose piece defining said central receiving opening, wherein the nose piece defines at least one of
   the outer surface or
   the inner surface.

4. Clamping device according to claim 1, further comprising a gear workpiece defining a shaft and a head region defining a heel defining a rear heel surface, and configured to be at least substantially parallel to a plane extending at least substantially perpendicular to the workpiece spindle axis when the shaft of the gear workpiece is inserted into the central receiving opening.

5. Clamping device according to claim 4, further comprising means for applying an axial tensile force on the gear workpiece at least substantially parallel to the workpiece spindle axis, wherein the means is configured to apply said force to the shaft by frictional connection therebetween to pull the gear workpiece together with the shaft into the central receiving opening.

6. Clamping device according to claim 4, wherein said gear workpiece is clamped in a clamped state by frictional connection therebetween on the shaft and by a positive connection between the annular planar contact surface and the rear heel surface of the heel, wherein the at least one circumferential groove changes shape during clamping and thereby generates a restoring force in the clamping device.

7. Clamping device according to claim 6, wherein said restoring force acts in the clamped state at least substantially in an axial direction on the rear heel surface of the heel.

8. Clamping device according to 4, configured to generate a positive connection and a frictional connection between the rear heel surface of the heel and the annular planar contact surface that are maintained during a temperature-related expansion of the gear workpiece.

9. Clamping device according to claim 2, further comprising a gear workpiece defining a shaft and a head region defining a heel defining a rear heel surface, and configured to be at least substantially parallel to a plane extending at least substantially perpendicular to the workpiece spindle axis when the shaft of the gear workpiece is inserted into the central receiving opening.

10. Clamping device according to claim 3, further comprising a gear workpiece defining a shaft and a head region defining a heel defining a rear heel surface, and configured to be at least substantially parallel to a plane extending at least substantially perpendicular to the workpiece spindle axis when the shaft of the gear workpiece is inserted into the central receiving opening.

11. Clamping device according to claim 5, wherein said gear workpiece is clamped in a clamped state by frictional connection therebetween on the shaft and by a positive connection between the annular planar contact surface and the rear heel surface of the heel, wherein the at least one circumferential groove changes its shape during clamping and thereby generates a restoring force in the clamping device.

12. Clamping device according to 5, configured to generate a positive connection and a frictional connection between the rear heel surface of the heel and the annular planar contact surface that are maintained during a temperature-related expansion of the gear workpiece.

* * * * *